April 5, 1949.  E. J. JOHANSSON  2,466,315
CHUCK

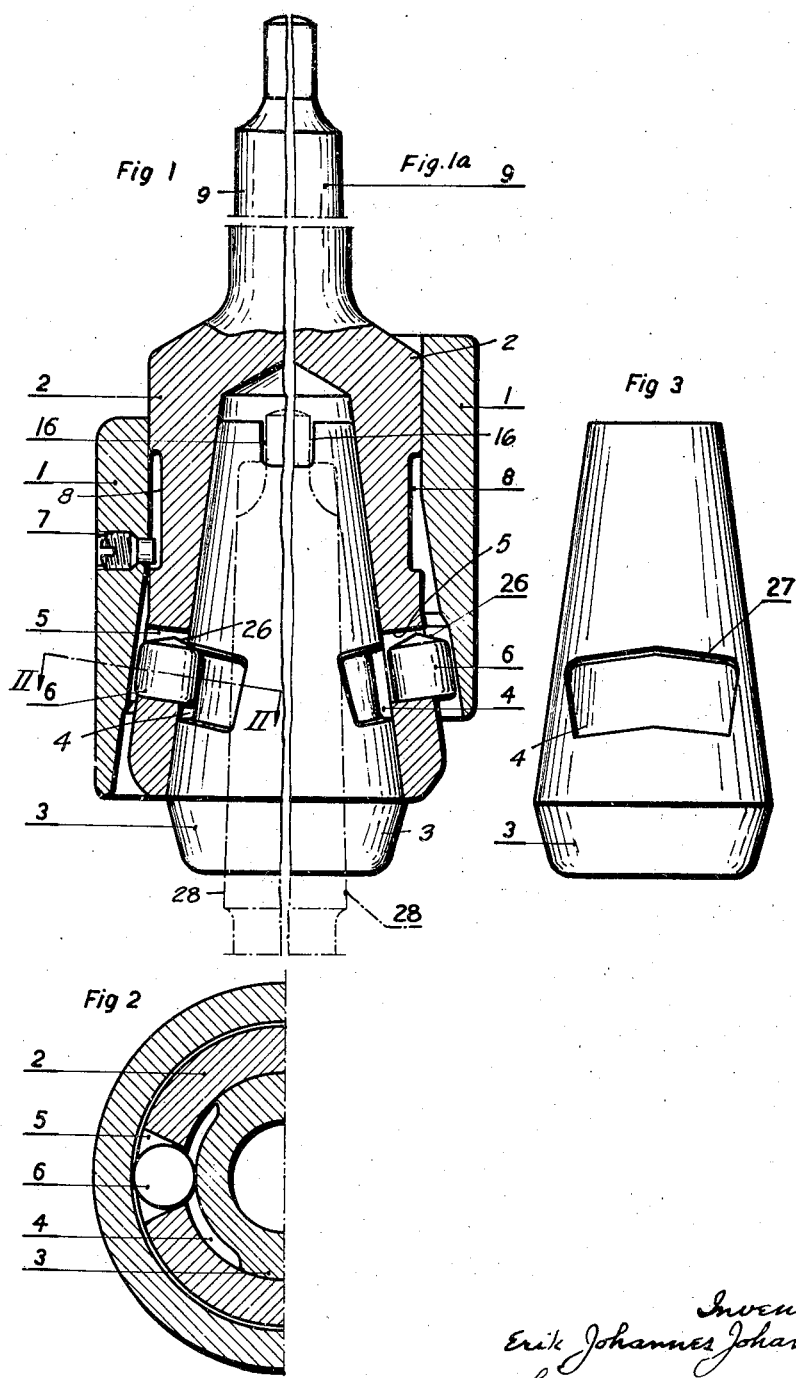

Filed June 13, 1945  3 Sheets-Sheet 2

Inventor:
Erik Johannes Johansson,
by
Pierce & Scheffler,
Attorneys.

April 5, 1949.  E. J. JOHANSSON  2,466,315
CHUCK
Filed June 13, 1945  3 Sheets-Sheet 3

Inventor:
Erik Johannes Johansson,
by Pierce-Scheffler,
Attorneys.

Patented Apr. 5, 1949

2,466,315

UNITED STATES PATENT OFFICE 2,466,315

CHUCK

Erik J. Johansson, Bengtsbo, Brickegarden, Karlskoga, Sweden

Application June 13, 1945, Serial No. 599,190
In Sweden October 21, 1943

5 Claims. (Cl. 279—74)

This invention relates to improvements in chucks primarily intended for use as tool holding chucks in machine tools such as turning or drilling machines etc. in the operation of which the tool or the work piece rotates, and it is an object of the invention to provide improved means enabling an operator to safely, readily and rapidly replace the tool manually without stopping the rotating driving spindle and irrespective of its rotary direction.

Another object of the invention consists in the provision of improved means for latching the tool to the chuck without risk of damaging the interlocking means even though they are adopted to latch in opposite rotary directions and even though the disengagement and reengagement will take place forcibly on rotating the chuck or the work piece in engagement with the tool.

Still another object of the invention consists in the provision of means for positively disengaging the tool latching means to facilitate and accelerate or rather enable the withdrawal of the tool from the chuck even though the tool latching means interlock forcibly on a wedging fit less than the angle of friction.

Still another object of the invention consists in the provision of a chuck having latch members adapted to engage interlocking abutments on a tool or tool carrier without jumping and without being damaged or damaging said abutments when forcibly contacting said abutments by rapid relative rotary motion of said latch members and said tool or tool carrier, respectively.

With these and other objects, not specifically mentioned in view the invention consists in certain constructions and combinations hereinafter fully described and then specifically set forth in the claims hereunto appended.

In the accompanying drawings which form a part of this specification, and in which like characters of reference indicate the same or equivalent parts:

Fig. 1 is an elevational sectional view of the left half of the chuck showing the chuck in latched driving position and Fig. 1a is a similar view of the right half showing the chuck in released position;

Fig. 2 is a cross sectional view on the line II—II of Fig. 1;

Fig. 3 is a side view of the tool carrying member of the chuck;

Figure 4:
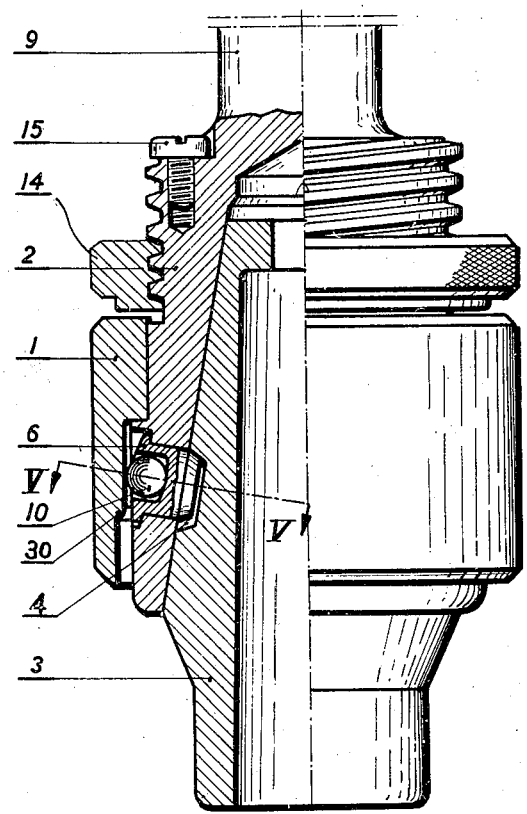
Fig. 4 is an elevational view, partly in section, of another embodiment of the invention.

Referring to the Figs. 1 to 3 of the drawings, the chuck has a taper bored core 2 the shank 9 of which is adapted to be inserted into the rotary driving spindle of a machine tool. The shank 9 may be of any shape suitable for the machine for which the chuck is adapted. A slidable locking sleeve 1 is slipped on the core 2 into which is inserted a cone 3 fitting tightly therein and carrying the tool 28. The locking sleeve 1 has an interiorly slightly bevelled bottom end and its longitudinal displacements on the core 2 are limited by a stop screw 7 which is screwed into the sleeve 1 and projects into a wide circumferential groove 8 in the core 2. The core 2 has in its wall two oppositely disposed apertures 5 in which are inserted latch rollers 6 which have conical upper ends 26 and are positioned longitudinally of the chuck. The lower plane surfaces of the apertures 5 of the core 2 constitute seats for the rollers 6 and taper inwardly and they are at their outer ends wider and at their inner ends narrower than the latch rollers 6. The cone 3 is exteriorly provided with two oppositely disposed Λ-shaped latch grooves 4 having a downwardly facing upper surface 27 which extends downwardly in two symmetrically disposed sections, one section being a righthanded spiral and the other being a lefthanded spiral. These spiral surfaces are beveled at such an angle, as viewed in a radial plane such as illustrated in Fig. 1, that the beveled surface is parallel to the conical upper surface of the roller 6. The upper sides 27 of said grooves constitute downwardly facing shoulders for which the conical ends of the rollers 6 constitute seats which are engaged with line contact, as distinguished from the point contact engagement obtained with the conventional steel ball type of latch elements. Limitation as to downwardly facing shoulders is used in connection with a vertical chuck but the present invention relates, of course, to the same chuck even though the same would be turned into a horizontal position.

The inner conical surface of the sleeve 1, the conical fit of the cone 3 in the core 2, and the wedging fit of the upper ends 26 of the rollers 6 on the bevelled upper sides 27 of the grooves 4 may, if desired, correspond to a wedge angle not less than the angle of friction whereby releasing of the clutch and disengagement of the tool will be facilitated. If the clutch is driven by a horizontal spindle a spring (not shown) is conveniently adapted to force the sleeve 1 into the locking position shown to the left in Fig. 1.

For replacement of the tool the sleeve 1 is raised manually by the operator whereby the latch rollers 6 are released and moved by centrifugal force, e. g. move out of the grooves 4 and release the cone 3 which together with the tool 28 will drop into the operator's hand. For reinserting a tool together with its cone 3 the sleeve 1 having dropped into its locking position is raised again and the cone 3 is inserted into the core 2 whereby the rollers 6 are primarily forced outwardly by the cone. Thereafter the sleeve 1 is dropped so that its bevelled inner surface urges the rollers 6 against the cone 3. Thereafter on the rotary motion of the chuck or the work piece the core 2 and the cone 3 are relatively rotated to an extent defined by the play between the upper ends 26 of the rollers 6 and the upper spiral walls 27 of the grooves 4 as well as the play between the core 2 and the cone 3 so that the rollers 6 will ride on the spiral groove walls 27 until the cone 3 has been firmly pressed into the bore of the core 2 whereafter the rollers 6 will serve as latch members as well as drivers. Due to the fact that the latching is effected by pressure on seats of substantially larger area than mere point contacts, viz. generatrices of the upper ends 26 and the bottom surfaces of the rollers 6 seated on the core 2, a very firm interlocking is afforded without risk of damage or wear of the latch members and their seats. Furthermore, the pressure seats at the opposite ends of the latching members 6 are so located that the resultant of the compression stress to which each latching member is subjected passes through those seats, i. e., the lower plane surface of each latching member 6 is held firmly against the complementary lower plane surface of an aperture 5 of core 2 by a pressure which has a component parallel to the chuck axis which is substantially greater than the component transverse to that axis. The pressures are exerted approximately parallel to the axes of the latching members, thereby developing frictional resistance to sliding movement of the latching members into inoperative position which offsets any tendency towards a release of the latching members by radial components of the pressures applied to the latching members. This is of very great importance if the interlocking is effected forcibly by rotary movement of the machine spindle or the work piece and in consideration of the fact that the chuck is developed for rotary motion in either direction, in which case it may happen that the latch members enter any one of the relatively steep grooves when the machine spindle revolves at full speed and the tool is retained by the work piece.

Figure 6:
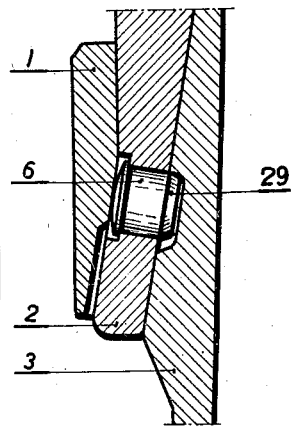
Fig. 6 is an elevational sectional view of part of modified embodiment of the chuck shown in Fig. 4.
Figure 5:
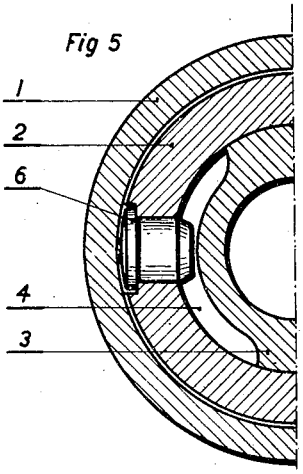
Fig. 5 is a cross sectional view on the line V—V of Fig. 4.
Figure 7:
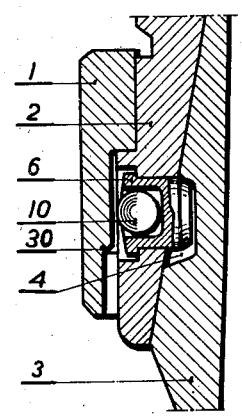
Fig. 7 is an elevational sectional view of part of still another modified embodiment of the chuck shown in Fig. 4.
Figure 8:
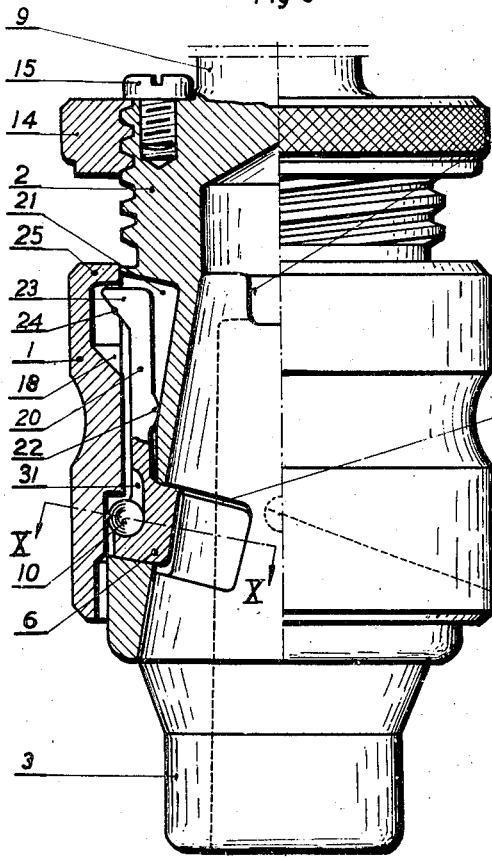
Fig. 8 is an elevational sectional view, partly in section, of still another embodiment of the invention.
Figure 9:
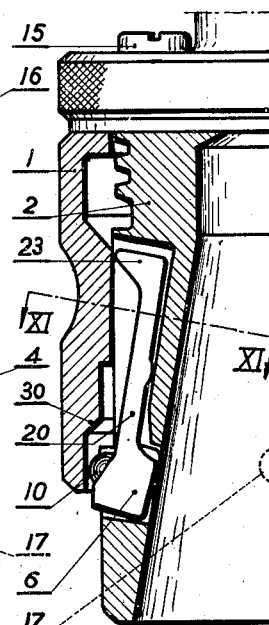
Fig. 9 is an elevational sectional view of part of the chuck shown in Fig. 8, when being in released position.
Figure 10:
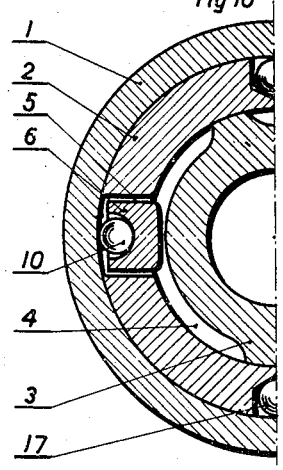
Fig. 10 is a cross sectional view on the line X—X of Fig. 8.
Figure 11:
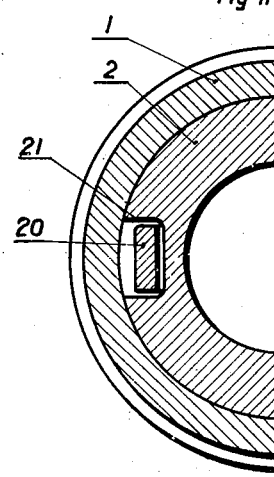
Fig. 11 is a cross sectional view on the line XI—XI of Fig. 9.

In the embodiments shown in Figs. 4 and 6 the latch members consist of cylindrical bolts 6 which are slidably fitted into apertures in the core 2 and directed transversely to the surface, i. e. the opposite generatrix of the cone 3. The bolts 6 project at their tapered inner ends 29 into grooves 4 arranged in the cone 3 in the same manner as shown in Fig. 3. One or several balls 10 or rollers are loosely inserted into recesses in the bolts 6 and serve to decrease the friction between the sleeve 1 and the bolts 6 so that the inner surface of the sleeve can be cylindrical or substantially cylindrical, e. g. provided with a narrow conical surface 30 having a wide angle of taper for rapidly forcing the bolts 6 into the grooves 4. In the modified embodiment as shown in Fig. 6 the bolts 6 have bellied rear ends instead of balls. The bolts 6 may, if desired, have other directions than that shown in Figs. 4 and 6. Thus, instead of being inclined as shown in Figs. 4 and 6 the bolts 6 may be directed transversely to the axis of the core 3 as shown in Fig. 7. In this embodiment the sleeve 1 is conveniently slightly tapered interiorly. In operation the embodiments as shown in Figs. 4 to 7 act in the same manner and afford the same advantages as those described and explained with reference to Figs. 1 to 3. With regard to its operability this embodiment affords the same advantages as that described with reference to Figs. 1 to 3.

If the machine spindle is horizontal or if the weight of the sleeve 1 is not sufficient to force by wedging-contact the latch members 6 into the grooves 4 and hold them in locking position the chuck may e. g. be provided with a lock nut 14 applied to the core 2 and being adapted to be screwed down to press against the sleeve 1. The upward movement of the nut 14 is limited by a stop screw 15 in the core 2. The downward movement of the sleeve 1 is limited by an enlarged portion of the core 2 and a corresponding annular shoulder in the sleeve 1.

In the embodiment shown in Figs. 8 to 11 the latch members 6 consist of inwardly projecting lugs on the lower ends of two oppositely disposed locking levers 20 which are loosely inserted into longitudinal grooves 21 in the core 2. Each lever 20 is supported by the core 2 radially by means of a rounded shoulder 22 and axially by its latch lug 6 projecting into apertures in said core. At its upper end each rocking lever 20 has an outwardly projecting nose 23 the lower surface 24 of which is bevelled. The sleeve 1 has interiorly a correspondingly bevelled annular surface 18 and at its upper end it has an inwardly extending flange 25 which protects the levers 20 and the grooves 21 from entrance of borings etc. The sleeve 1 has interiorly at its bottom end a bevelled surface 30 engaging balls 10 which are loosely inserted into the levers 20 behind the latch lugs 6 so as to force the lugs 6 into the grooves 4 of the cone 3 (Fig. 3) when sliding downwards. The sleeve 1 enclosing the levers 20 is supported radially by the balls 10 as well as by still another pair of balls 17 loosely inserted in the core 2. In this embodiment of the invention there is also provided a ring 14 and a stop screw 15 similar to those described with reference to Fig. 4. The ends of the latch lugs 6 adapted to project into the grooves 4 are conveniently not cylindrical but a part thereof opposing the upper sides or shoulders 27 of the grooves 4 is bevelled to afford fitting contact at surfaces of some extension.

The embodiment as shown in Figs. 8 to 11 affords the same advantages as those described and explained with reference to Figs. 1 to 7 and in addition thereto still another useful effect is obtained in as much as the latch members viz. the lugs 6 are positively retracted from the grooves 4 when the sleeve 1 is lifted. Thus when retracting the sleeve 1 from its locking position the conical surface 18 of the sleeve abuts the bevelled faces 24 of the levers 20 so that the upper ends of said levers are forced inwardly whereby the lower ends of said levers together with the lugs 6 are forced outwardly. Consequently the pitch angle of the grooves 4 as well as the wedge angles at the wedging contact between the latch members 6 and the shoulders 27 may be less than the angle of friction.

In the embodiment as described a tapered bore of the cone 3 terminates in a slot 16. This slot has such a shape that the end of the shank of the tool 28 projecting out of said slot is accessible for hammering or the like to disengage the tool from the cone after the cone is removed from the body portion 2. This arrangement affords a very steady and compact construction in as much as the tool 28 can be introduced further into the cone 3 than would be the case when using ordinary cones having grooves (with bottom) for the chisel of the tool shank.

I claim:

1. A self-engaging chuck comprising an internally tapered core having a substantially transverse aperture in its wall, a complementary externally tapered cone seated in said core and detachable therefrom, said cone having a recess in its tapered surface which includes a downwardly facing spiral shoulder, a latch roller displaceable inwardly and outwardly in said aperture, and a locking member slidable on said core to force said latch roller into said recess below said shoulder to thereby cause said roller to roll upon its axis and wedge between said shoulder and the lower surface of said aperture upon relative rotation of said core and cone, the cooperating contacting surfaces of said latch roller and said shoulder being conical and inclined to the axis of said core to establish in said latch roller a compression stress having a resultant passing through the lower and contacting surfaces of said latch roller and said aperture, the axial component of said resultant being substantially greater than the complementary radial component.

2. A self-engaging chuck as defined in claim 1 wherein said latch roller rotates on an axis perpendicular to its axis of displacement and the lower surface of said roller slides in contact with a cooperating flat surface of said aperture.

3. A self-engaging chuck as defined in claim 1 wherein said aperture is a cylindrical bore and said latch roller rotates on an axis coincident with the axis of said bore.

4. A self-engaging chuck as defined in claim 3 wherein the outer end of said latch roller is recessed and an anti-friction member is seated in the recess for engagement by said locking member.

5. A self-engaging chuck comprising an internally tapered core having a substantially transverse aperture in its wall, a complementary externally tapered cone seated in said core and detachable therefore, said cone having a recess in its tapered surface which includes a downwardly facing spiral right-handed shoulder and a downwardly facing spiral left-handed shoulder, a latch roller displaceable inwardly and outwardly in said aperture, and a locking member slidable on said core to force said latch roller into said recess to thereby cause said roller to roll upon its axis and wedge between one or the other of said shoulders according to the direction of relative rotary motion of said core and cone and the lower surface of said aperture, the cooperating contacting surfaces of said latch roller and said shoulders being conical and inclined to the axis of said core to establish in said latch roller a compression stress having a resultant passing through the lower and contacting surfaces of said latch roller and said aperture, the axial component of said resultant being substantially greater than the complementary radial component.

ERIK J. JOHANSSON.

REFERENCES CITED

The following references are of record in the file of this patent:

UNITED STATES PATENTS

| Number | Name | Date |
|---|---|---|
| Re. 13,724 | Lindberg | May 12, 1914 |
| 489,722 | Thompson | Jan. 10, 1893 |
| 1,056,076 | Wiard | Mar. 18, 1913 |
| 1,124,981 | Weaver | Jan. 12, 1915 |
| 1,252,253 | Du Fresne | Jan. 1, 1918 |
| 1,414,110 | Bocchio | Apr. 25, 1922 |
| 1,686,601 | Currier | Oct. 9, 1928 |
| 1,740,645 | Currier | Dec. 24, 1929 |
| 1,781,442 | Currier | Nov. 11, 1930 |

FOREIGN PATENTS

| Number | Country | Date |
|---|---|---|
| 500,298 | France | Mar. 16, 1920 |